R. DALLEY.
APPARATUS FOR STEAMING FOOD FOR STOCK.
No. 179,162. Patented June 27, 1876.
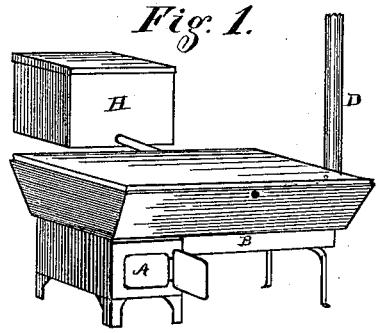
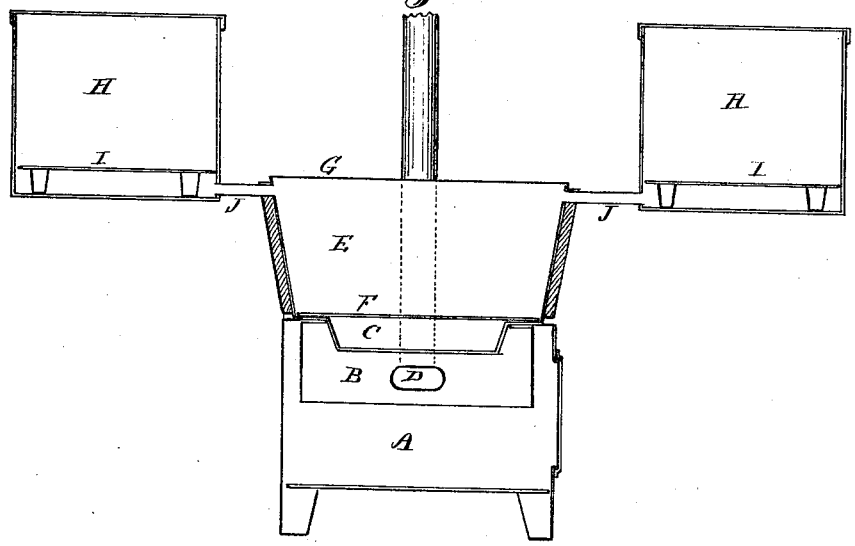

UNITED STATES PATENT OFFICE.

ROMAIN DALLEY, OF QUINCY, MICHIGAN.

IMPROVEMENT IN APPARATUS FOR STEAMING FOOD FOR STOCK.

Specification forming part of Letters Patent No. 179,162, dated June 27, 1876; application filed April 29, 1876.

*To all whom it may concern:*

Be it known that I, ROMAIN DALLEY, of Quincy, in the county of Branch and State of Michigan, have invented certain Improvements in Apparatus for Steaming Food for Stock, of which the following is a specification:

These improvements relate to apparatus for steaming food for live stock; and consist of auxiliary steam-boxes, in combination with the main steam-box, and being additional improvements on my patent dated January 18, 1876, whereby two or more different kinds of food can be cooked at one and the same time, the capacity of the furnace being adequate for that purpose.

To enable others to fully understand my improvements, I proceed to describe the same in detail, with the aid of the accompanying drawing, in which—

Figure 1 is a perspective view. Fig. 2 is a cross-section.

A represents a fire-box, provided with a grate and ash-pit. B is a combustion-chamber underneath a boiler or pan, C, leading to the smoke-pipe D. E is a removable steam-box, consisting of a wooden box or case lined with metal, the bottom being formed into a pit or pan comprising the water-holder and boiler. The steam-box E is provided with a removable perforated false bottom, F, upon which the vegetables or grain lie for cooking. The box E is provided with a removable cover, G.

So far this specification is a substantial description of my patent of January 18, 1876.

Now, in order to increase the capacity of the apparatus, and to enable it to cook other articles of food, I arrange auxiliary steam-boxes H H, provided with false bottoms I, connected with the main steam-box E by pipes J, by which steam is conveyed thereto, the capacity of the furnace being found to be sufficient for the purpose.

By this means, in one box potatoes may be cooked, in another corn, and in another hay, thus enabling the possessor to cook a variety of food for his stock all at the same time, which could not be done in my former apparatus.

Having described my improvements, I claim—

1. The auxiliary steam heating-boxes H H, having the removable false bottoms I and pipes J, in combination with a main heater, E, substantially as shown and described.

2. The auxiliary steam-heaters H I H I, in combination with the heater A B C D E F G, constructed, arranged, and operating substantially as shown and described.

ROMAIN DALLEY.

Witnesses:
  GEO. W. TIBBITTS,
  F. W. CADWELL.